United States Patent
Tadeparthy

(10) Patent No.: US 8,115,337 B2
(45) Date of Patent: Feb. 14, 2012

(54) SOFT-START CIRCUIT

(75) Inventor: Preetam Charan Anand Tadeparthy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 692 days.

(21) Appl. No.: 12/325,625

(22) Filed: Dec. 1, 2008

(65) Prior Publication Data

US 2010/0133909 A1 Jun. 3, 2010

(51) Int. Cl.
*H02J 4/00* (2006.01)
(52) U.S. Cl. .............................. 307/52; 307/87
(58) Field of Classification Search .............. 307/52, 307/87
See application file for complete search history.

(56) References Cited

U.S. PATENT DOCUMENTS

| | | | |
|---|---|---|---|
| 5,774,315 A * | 6/1998 | Mussenden | 307/87 |
| 6,333,623 B1 | 12/2001 | Heisley et al. | |
| 6,559,623 B1 | 5/2003 | Pardoen | |
| 6,867,640 B2 | 3/2005 | Scott et al. | |
| 6,977,491 B1 | 12/2005 | Caldwell et al. | |
| 7,233,462 B2 | 6/2007 | Kanakubo | |
| 7,315,154 B2 | 1/2008 | Sugiura | |
| 7,414,332 B2 * | 8/2008 | Ohsuga | 307/80 |
| 7,535,123 B2 * | 5/2009 | Formenti et al. | 307/80 |
| 7,615,965 B2 * | 11/2009 | Popescu-Stanesti et al. | 320/128 |
| 2003/0090158 A1 * | 5/2003 | Fauh et al. | 307/87 |
| 2008/0129121 A1 * | 6/2008 | Formenti et al. | 307/81 |
| 2008/0185914 A1 * | 8/2008 | Randall | 307/64 |

* cited by examiner

*Primary Examiner* — Fritz M Fleming
(74) *Attorney, Agent, or Firm* — John J. Patti; Wade J. Brady, III; Frederick J. Telecky, Jr.

(57) ABSTRACT

An apparatus is provided. The apparatus comprises an input circuit, a startup circuit, and a current limiter. The input circuit is coupled to a first source and is adapted to provide a first voltage and a first current to a load having a capacitance. The startup circuit is coupled to the input circuit and to the first source, and the startup circuit includes a current source and a startup capacitor coupled in series with one another. The current limiter has a cascode circuit and a discharge circuit. The cascode circuit has a bias transistor and a power transistor coupled in series with one another to provide a second voltage and a second current to the load, where the bias transistor is coupled to a second source and where the bias transistor generally operates as source follower during startup. The discharge circuit is coupled to a node between the bias transistor and the power transistor of the cascode circuit and coupled to a node between the startup current source.

12 Claims, 2 Drawing Sheets

SOFT-START CIRCUIT

TECHNICAL FIELD

The invention relates generally to power circuitry and, more particularly, to a soft-start circuit.

BACKGROUND

Many devices today have the capability of operating from one or more different power sources. For example, mobile phones can operate on battery power or from an AC outlet. Transition between these various power sources can be difficult because the switch-over can create current spikes or relatively large in-rush currents. There have been various proposed circuit to adjust for in-rush currents. Some examples conventional circuits are U.S. Pat. Nos. 6,333,623; 6,559,623; 6,867,640; 6,977,491; 7,233,462; and 7,315,154.

SUMMARY

An embodiment of the present invention, accordingly, provides an apparatus. The apparatus comprises an input circuit that is coupled to a first source, wherein the input circuit is adapted to provide a first voltage and a first current to a load having a capacitance; a startup circuit that is coupled to the input circuit and to the first source, wherein the startup circuit includes a current source and a startup capacitor coupled in series with one another; and a current limiter. The current limiter has a cascode circuit having a bias transistor and a power transistor coupled in series with one another, wherein the bias transistor is coupled to a second source and is coupled to the node between the current source and the startup capacitor, and wherein the cascode circuit is adapted to provide a second voltage and a second current to the load, and wherein the bias transistor generally operates as a source follower during startup; and a discharge circuit coupled to a node between the bias transistor and the power transistor of the cascode circuit and coupled to a node between the startup current source and the startup capacitor.

In accordance with an embodiment of the present invention, the bias transistor further comprises a FET with a bias is applied to its gate, the second source coupled to its drain, and the discharge circuit coupled to its source.

In accordance with an embodiment of the present invention, the power transistor further comprises a FET with its drain coupled to the source of the bias transistor, its gate receives an error signal from an amplifier, and its source outputs an output voltage.

In accordance with an embodiment of the present invention, the cascode circuit further comprises a plurality of resistors coupled to the power transistor, wherein the resistors are coupled in series with one another.

In accordance with an embodiment of the present invention, the discharge circuit further comprises a FET with its drain coupled to the cascode circuit and its gate coupled to the node between the startup current source and the startup capacitor; and a switch coupled to the source of the FET that is adapted to be actuated by a startup signal.

In accordance with an embodiment of the present invention, the current limiter further comprises a biasing current source that is coupled to the biasing transistor.

In accordance with an embodiment of the present invention, an apparatus for transitioning power between a plurality of power sources to a load is provided. The apparatus comprises an amplifier that receives a feedback voltage corresponding to an output voltage supplied to the load and that receives a reference voltage; an input circuit that is coupled to a first source, wherein the input circuit is adapted to provide a first voltage and a first current to a load having a capacitance; a startup circuit that is coupled to the input circuit and to the first source, wherein the startup circuit includes a current source and a startup capacitor coupled in series with one another; and a current limiter. The current limiter has a cascode circuit having a bias transistor and a power transistor coupled in series with one another, wherein the bias transistor is coupled to a second source and is coupled to the node between the current source and the startup capacitor, and wherein the cascode circuit is adapted to provide a second voltage and a second current to the load, and wherein the bias transistor generally operates as a source follower during startup; and a discharge circuit coupled to a node between the bias transistor and the power transistor of the cascode circuit and coupled to a node between the startup current source and the startup capacitor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
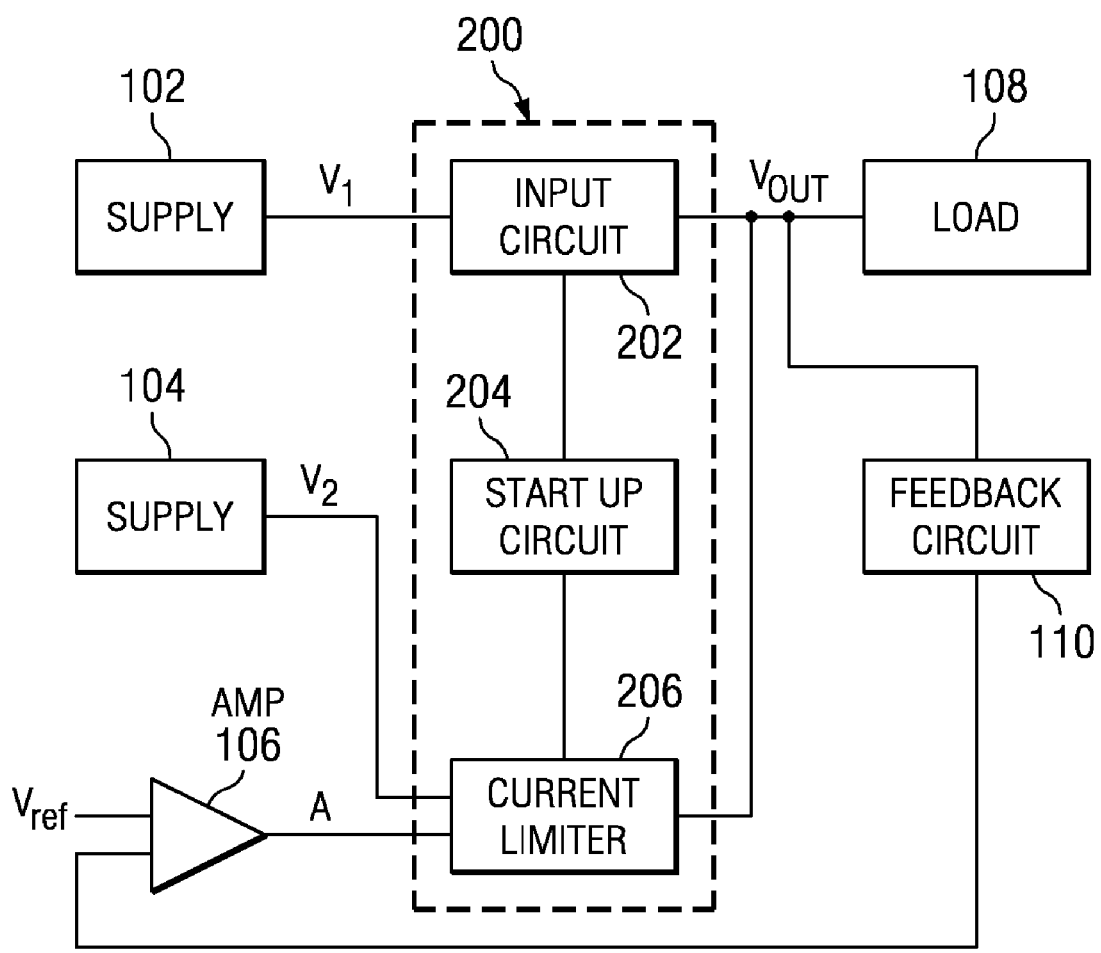
FIG. 1 is a system employing a sourcing circuit in accordance with an embodiment of the present invention.

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally depicts a system employing a sourcing circuit in accordance with an embodiment of the present invention. System 100 generally comprises power supplies 102 and 104, an error amplifier 106, a load 108, a feedback circuit 110, and a sourcing circuit 200.

In operation, power flows from one (or potentially both) power supplied 102 and 104 (such as a battery and AC rectified source) to the load 108. Generally, though, sourcing circuit 200 operates to transition between power supplies. Preferably, sourcing circuit 200 generally limits the in-rush current when a transition occurs from supply 102 to supply 104. When a transition from supply 102 to supply 104 is occurring, a feedback circuit 110 (which is preferably a voltage divider) feeds back a measurement of the output voltage $V_{OUT}$ to an error amplifier 106 (which compares the feedback to a reference voltage $V_{REF}$). Base on the output of the error amplifier 106, the souring circuit 200 can produce a soft-start or soft transition.

Figure 2:
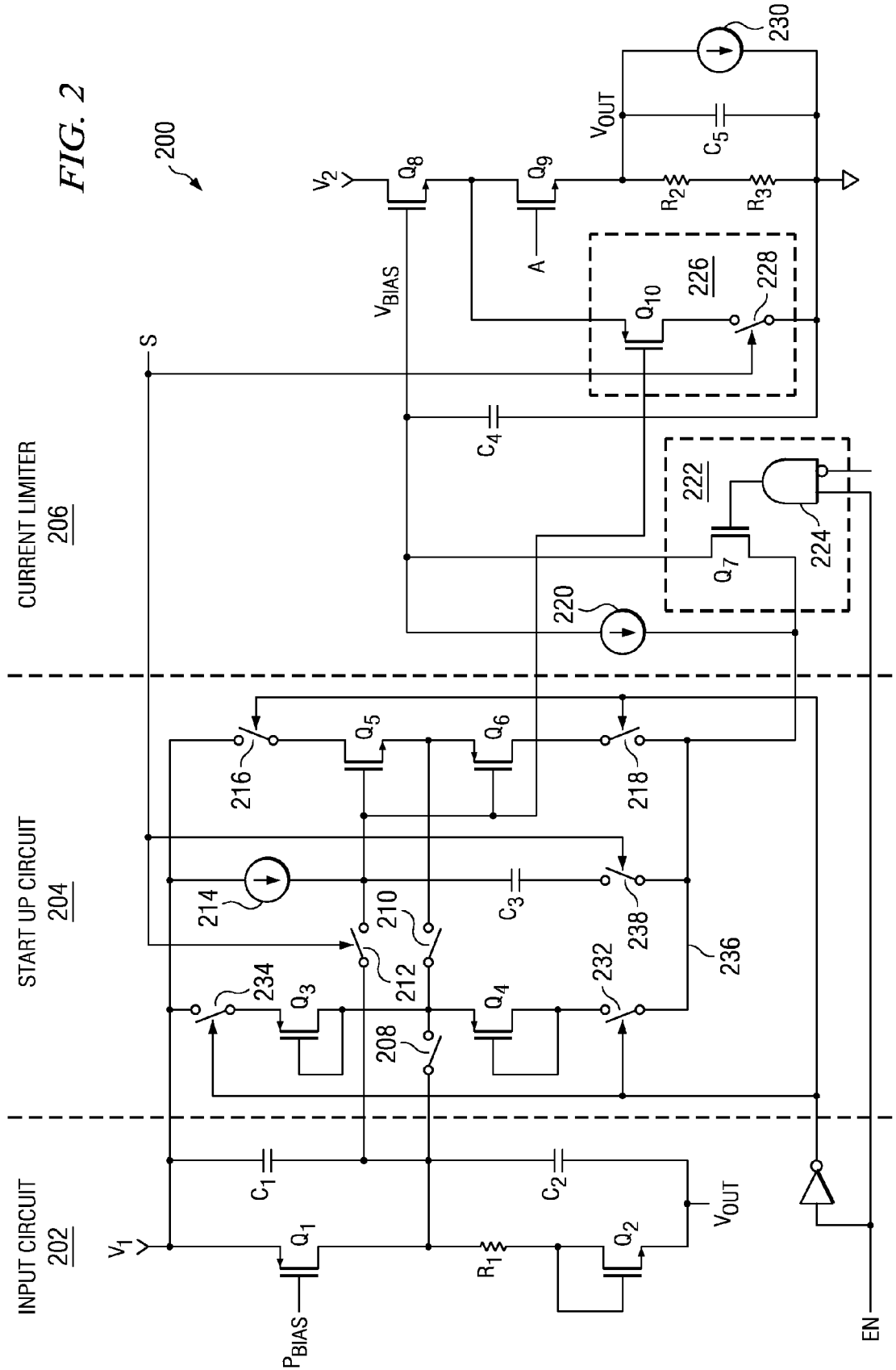
FIG. 2 is a block diagram of the sourcing circuit of FIG. 1.

The sourcing circuit 200 can be seen in more detail in FIG. 2. Sourcing circuit 200 is generally comprised of an input circuit 202, a startup circuit 204, and a current limiter 206.

Generally, the input circuit 202 allows for supply 102 to be coupled to the load 108. Preferably, the supply 102 is a large power supply, such as a AC rectified power supply, that inputs an input voltage $V_1$ into the input circuit 202. The input circuit is generally comprised of the following: a transistor $Q_1$ (which is preferably a PMOS FET) that receives a bias voltage PBIAS; a resistor $R_1$ coupled to the transistor $Q_1$; a diode-connected transistor $Q_2$ (which is preferably an NMOS FET) is coupled to the resistor $R_1$; and a pair of capacitors $C_1$ and $C_2$. The input circuit 202 then outputs the output voltage $V_{OUT}$ to the load 108.

Coupled to the input circuit 202 is the startup circuit 204. The startup circuit 204 is generally comprised of three branches that are generally in parallel with one another. The first branch is generally comprised of a switch 234 coupled between a diode-connected transistor $Q_3$ (preferably a PMOS FET) and the input voltage $V_1$ and a switch 232 coupled between a second rail 236 (generally ground) and a diode-connected transistor $Q_4$ (preferably an NMOS FET). Additionally, switch 208 is coupled between the node between transistors $Q_3$ and $Q_4$ and the node between capacitors $C_1$ and $C_2$, transistor $Q_1$, and resistor $R_1$. The second branch is generally comprised of a current source 214, a capacitor C3, and a switch 238. Additionally, switch 212 is coupled between the node between current source 214 and capacitor C3 and the node between capacitors $C_1$ and $C_2$, transistor $Q_1$, and resistor $R_1$. The third branch is generally comprised of a switch 216 coupled between the input voltage $V_1$ and transistor $Q_5$ and a switch coupled between the second rail 236 and transistor $Q_6$. Additionally, the control electrodes (preferably, gates in a FET arrangement) of transistors Q5 and Q6 are coupled the node between the current source 214 and capacitor $C_3$.

In operation, the startup circuit 204 can enable operation of either input circuit 202 or current limiter 206 or can transition between the two. This is generally accomplished through the actuation of switches 208, 210, 212, 234, 232, and 238; switches 216 and 218 are actuated inversely to switches 208, 210, 212, 234, 232, and 238. During startup, a startup signal S is transmitted from external logic to switches 212 and 238, which allows current source 214 to charge capacitor $C_3$ and to provide a connection between the input circuit 202 and the current limiter 206. Additionally, during operation of either the input circuit 202 or the current limiter 206, an enable signal EN (preferably an inverse of the enable signal EN) is communicated to switches 232, 234, 216, and 218 to allow operation of either based on the logic level of the enable signal EN.

Coupled to the control electrode of transistors $Q_5$ and $Q_6$ is the discharge circuit 226 of the current limiter 206. Preferably, the control electrodes of the transistors $Q_5$ and $Q_6$ are coupled to the control electrode of transistor $Q_5$ (which is preferably a PMOS FET). The discharge circuit 226 also generally comprises a switch 228 that is actuated by the startup signal S.

The current limiter 206 employs a cascode circuit to accomplish its current limiting. The cascode circuit is generally comprised of transistors $Q_8$ (bias transistor) and $Q_9$ (power transistor) and resistors $R_2$ and $R_3$, with the output voltage $V_{OUT}$ being derived from the node between transistor $Q_9$ and resistor $R_2$. Preferably, transistors $Q_8$ and $Q_9$ are NMOS FETs, which are coupled in series with one another. Typically, with an NMOS FET arrangement, the drain of transistor $Q_8$ is coupled to supply (receiving voltage $V_2$), and the source of transistor $Q_8$ is coupled to the drain of transistor $Q_9$ (while the resistors R1 and R2 are coupled in series between the source of transistor $Q_9$ and ground). Additionally, the control electrode (or gate in an NMOS FET arrangement) of transistor $Q_8$ (which has a parasitic capacitance $C_4$) receives a bias voltage $V_{BIAS}$ from biasing current source 220 and/or startup 204, and the control (or gate in an NMOS FET arrangement) of transistor $Q_9$ is coupled to the error amplifier 106. The discharge circuit 226 is also coupled to the node between transistors $Q_8$ and $Q_9$, which allows the node between transistors $Q_8$ and $Q_9$ to be pulled to ground to generally prevent an initial surge current.

The current limiter 206 also employs an enable circuit 222. The enable circuit 222 is comprised of a transistor $Q_7$ (which is preferably an NMOS FET) that is coupled in parallel to the current source 220. Coupled to the control electrode of transistor $Q_7$ is an AND gate 224 that receives the enable signal and a delayed enable signal. This enable circuit 222 generally allows the current source 220 to be "shut off."

When a startup signal S is received by switches 212, 238, and 228, the current source 214 and capacitor $C_3$ can provide a startup current to the current limiter 206. Generally, the measurement of the output voltage $V_{OUT}$ would initially be lower than the reference voltage $V_{REF}$, causing amplifier 106 to rail the control electrode of the transistor $Q_9$. Thus, the control electrode of transistor $Q_9$ is generally unable to exceed the rail, causing the transistor $Q_8$ to operate as a source follower. The source follower action of transistor $Q_8$ allows the current at the node between transistors $Q_8$ and $Q_9$ to increase at the same rates as capacitor $C_3$. As the current at the node between transistors $Q_8$ and $Q_9$ increases, transistor $Q_9$ should charge the output capacitor $C_5$ at about the same rate that $C_3$ is being charged. Therefore, sourcing circuit 200 preferably causes the voltage across of the transistor $Q_9$ to remain generally constant and to be at an offset voltage from the node between transistors $Q_8$ and $Q_9$. In other words, there is initially no (approximate) in-rush current until the offset voltage across transistor $Q_9$ is sufficiently large, and once the offset voltage across transistor $Q_9$ is sufficiently large, the capacitor $C_5$ is charged at a generally constant rate with no (approximate) additional change in current supplied to the output.

Additionally, if there is a load coupled to the output, which demands current from the transistor $Q_9$, additional current is generally supplied by transistor $Q_9$. To accomplish this, transistor $Q_9$ is adjusted so that the charging rate of capacitor $C_5$ remains generally constant. Additionally, the capacitance of capacitor $C_5$ is generally not predefined (varying by one or more orders of magnitude depending on the circumstances). Under these circumstances, too, transistor $Q_9$ can be adjusted to maintain a generally constant charging rate for capacitor $C_5$. Thus, circuit 200 generally ensures an in-rush current limit that tracks the load.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an input circuit that is coupled to a first source, wherein the input circuit is adapted to provide a first voltage and a first current to a load having a capacitance;

a startup circuit that is coupled to the input circuit and to the first source, wherein the startup circuit includes a current source and a startup capacitor coupled in series with one another; and a current limiter having:
- a cascode circuit having a bias transistor and a power transistor coupled in series with one another, wherein the bias transistor is coupled to a second source and is coupled to the node between the current source and the startup capacitor, and wherein the cascode circuit is adapted to provide a second voltage and a second current to the load, and wherein the bias transistor generally operates as a source follower during startup; and
- a discharge circuit coupled to a node between the bias transistor and the power transistor of the cascode circuit and coupled to a node between the startup current source and the startup capacitor.

2. The apparatus of claim 1, wherein the bias transistor further comprises a FET with a bias is applied to its gate, the second source coupled to its drain, and the discharge circuit coupled to its source.

3. The apparatus of claim 2, wherein the power transistor further comprises a FET with its drain coupled to the source of the bias transistor, its gate receives an error signal from an amplifier, and its source outputs an output voltage.

4. The apparatus of claim 3, wherein the cascode circuit further comprises a plurality of resistors coupled to the power transistor, wherein the resistors are coupled in series with one another.

5. The apparatus of claim 1, wherein the discharge circuit further comprises:
- a FET with its drain coupled to the cascode circuit and its gate coupled to the node between the startup current source and the startup capacitor; and
- a switch coupled to the source of the FET that is adapted to be actuated by a startup signal.

6. The apparatus of claim 1, wherein the current limiter further comprises a biasing current source coupled to the bias transistor.

7. The apparatus of claim 1, wherein the current limiter further comprises:
- a biasing capacitor that provide a bias to the cascode circuit; and
- a biasing current source that is adapted to charge the biasing capacitor.

8. An apparatus for transitioning power between a plurality of power sources to a load, the apparatus comprising:
- an amplifier that receives a feedback voltage corresponding to an output voltage supplied to the load and that receives a reference voltage;
- an input circuit that is coupled to a first source, wherein the input circuit is adapted to provide a first voltage and a first current to a load having a capacitance;
- a startup circuit that is coupled to the input circuit and to the first source, wherein the startup circuit includes a current source and a startup capacitor coupled in series with one another; and
- a current limiter having:
  - a cascode circuit having a bias transistor and a power transistor coupled in series with one another, wherein the bias transistor is coupled to a second source and is coupled to the node between the current source and the startup capacitor, and wherein the cascode circuit is adapted to provide a second voltage and a second current to the load, and wherein the bias transistor generally operates as a source follower during startup; and
  - a discharge circuit coupled to a node between the bias transistor and the power transistor of the cascode circuit and coupled to a node between the startup current source and the startup capacitor.

9. The apparatus of claim 8, wherein the bias transistor further comprises a FET with a bias is applied to its gate, the second source coupled to its drain, and the discharge circuit coupled to its source.

10. The apparatus of claim 9, the power transistor further comprises a FET with its drain coupled to the source of the bias transistor, its gate receives an error signal from an amplifier, and its source outputs an output voltage.

11. The apparatus of claim 10, wherein the cascode circuit further comprises a plurality of resistors coupled to the power transistor, wherein the resistors are coupled in series with one another.

12. The apparatus of claim 8, wherein the discharge circuit further comprises:
- a FET with its drain coupled to the cascode circuit and its gate coupled to the node between the startup current source and the startup capacitor; and
- a switch coupled to the source of the FET that is adapted to be actuated by a startup signal.

* * * * *